(12) United States Patent
Tseng

(10) Patent No.: US 10,743,380 B2
(45) Date of Patent: Aug. 11, 2020

(54) LIGHT EMITTING DIODE DRIVING DEVICE AND LIGHT EMITTING DIODE BACKLIGHT MODULE

(71) Applicant: Power Forest Technology Corporation, Hsinchu County (TW)

(72) Inventor: Yang-Tai Tseng, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 16/234,531

(22) Filed: Dec. 27, 2018

(65) Prior Publication Data

US 2020/0120769 A1 Apr. 16, 2020

(30) Foreign Application Priority Data

Oct. 12, 2018 (TW) .............................. 107135900 A

(51) Int. Cl.
| | | |
|---|---|---|
| *H05B 33/08* | (2020.01) | |
| *H05B 45/10* | (2020.01) | |
| *H02M 1/08* | (2006.01) | |
| *H05B 45/37* | (2020.01) | |
| *H02M 1/00* | (2006.01) | |

(52) U.S. Cl.
CPC .............. *H05B 45/10* (2020.01); *H02M 1/08* (2013.01); *H05B 45/37* (2020.01); *H02M 2001/0009* (2013.01)

(58) Field of Classification Search
CPC ................ H05B 33/08; H05B 33/0815; H05B 33/0851; H05B 33/0887; H05B 33/089; H05B 33/0845; H05B 45/10; H05B 45/14; H05B 45/325; H02M 1/00; H02M 1/08; H02M 2001/0003; H02M 2001/0009; G09G 3/34; G09G 3/3406
See application file for complete search history.

(56) References Cited

U.S. PATENT DOCUMENTS

| | | | |
|---|---|---|---|
| 8,027,178 B1* | 9/2011 | Chia ................ | H02M 3/33507 363/56.1 |
| 8,917,029 B2* | 12/2014 | Chu ................. | H05B 33/0815 315/185 R |
| 9,661,705 B1* | 5/2017 | Tseng .............. | H05B 33/0815 |
| 2010/0117618 A1* | 5/2010 | Cheng ............... | H02M 1/32 323/293 |
| 2011/0156593 A1 | 6/2011 | De Greef et al. | |
| 2011/0157246 A1* | 6/2011 | Jang ................ | G09G 3/3406 345/690 |
| 2013/0044272 A1* | 2/2013 | Gao ................ | H05B 33/0815 349/61 |
| 2013/0250215 A1* | 9/2013 | Sasaki ............. | H05B 33/0815 349/69 |
| 2013/0285571 A1* | 10/2013 | Li .................. | H05B 33/0821 315/297 |
| 2014/0125246 A1* | 5/2014 | Sasaki ............. | H05B 33/0845 315/224 |

(Continued)

*Primary Examiner* — Thai Pham
(74) *Attorney, Agent, or Firm* — JCIPRNET

(57) ABSTRACT

A light emitting diode driving device and a light emitting diode backlight module are provided. A current is provided to a filter circuit by a controllable current source controlled by a dimming signal, so that the filter circuit generates a corresponding dimming voltage to control current flowing through a LED unit to dim the LED unit.

10 Claims, 2 Drawing Sheets

(56) References Cited

U.S. PATENT DOCUMENTS

2014/0145627 A1* 5/2014 Jung .................. H05B 33/0818
　　　　　　　　　　　　　　　　　　　　　　　315/186
2016/0043628 A1* 2/2016 Chiang ................ H02M 3/156
　　　　　　　　　　　　　　　　　　　　　　　363/53
2019/0075630 A1* 3/2019 Lee .................... H05B 33/0806

* cited by examiner

LIGHT EMITTING DIODE DRIVING DEVICE AND LIGHT EMITTING DIODE BACKLIGHT MODULE

CROSS-REFERENCE TO RELATED APPLICATION

This application claims the priority benefit of Taiwan application serial no. 107135900, filed on Oct. 12, 2018. The entirety of the above-mentioned patent application is hereby incorporated by reference herein and made a part of this specification.

BACKGROUND OF THE INVENTION

1. Field of the Invention

The invention relates a driving device, and more particularly, relates to a light emitting diode driving device and a light emitting diode backlight module.

2. Description of Related Art

A conventional backlight module can be roughly classified into two types, i.e., a backlight module composed of cold cathode fluorescent lamps (CCFL) and a backlight module composed of light emitting diodes (LED). Since the light emitting diode backlight module is capable of improving color gamut of the LCD, panel manufacturers prefer to employ the light emitting diode backlight module in placement of the CCFL backlight module.

The light emitting diode backlight module includes a plurality of light emitting diode strings (LED strings) connected in parallel, and each light emitting diode string is composed of a plurality of light emitting diodes connected in series. Basically, all of the LED strings can operate under a system voltage generated by a boost unit, so that current flowing through each LED string maintains the same constant current.

In certain applications, brightness may need to be adjusted in order to match the ambient light or different displayed pictures. At present, a common method for achieving the same effect is to additionally provide a control signal and a voltage generating circuit for generating a set of voltages to control the current flowing through the LED string, so as to achieve the purpose of dimming. Although the purpose of dimming can be achieved by such method, to additionally provide a control signal will increase the complexity of the circuit design and may also increase the number of pins in a control chip of a driving device.

SUMMARY OF THE INVENTION

The invention provides a light emitting diode driving device and a light emitting diode backlight module that can perform dimming without additionally providing the control signal, thus preventing the number of pins of the control chip from increasing.

The light emitting diode driving device of the invention is adapted to drive a light emitting diode unit. The light emitting diode driving device includes a power conversion circuit, a control chip and a filter circuit. The power conversion circuit is configured to convert an input voltage into an output voltage to drive the light emitting diode unit. The power conversion circuit has a power switch. A control terminal of the power switch receives a switch control signal and switches a conducting state of the power switch according to the switch control signal to convert the input voltage into the output voltage. The control chip is coupled to the power conversion circuit and the light emitting diode unit. The control chip has a dimming pin and a feedback pin. The dimming pin and the feedback pin respectively receive a dimming signal and a feedback signal in response to an output current of the light emitting diode unit. The control chip generates the switch control signal according to a duty ratio of the dimming signal and the feedback signal. The control chip includes a controllable current source. The controllable current source generates a corresponding current according to the duty ratio of the dimming signal. The filter circuit is coupled to the controllable current source through the feedback pin, disposed on a feedback path between the light emitting diode unit and the feedback pin and generates a dimming voltage according to the corresponding current provided by the controllable current source to adjust current flowing through the light emitting diode unit.

In an embodiment of the invention, the filter circuit includes a resistor. The resistor is coupled between the feedback pin and the light emitting diode unit, and the dimming voltage is generated on the resistor.

In an embodiment of the invention, the filter circuit further includes a capacitor. One terminal of the capacitor is coupled to one terminal of the resistor, and another terminal of the capacitor is coupled to another terminal of the resistor or ground.

In an embodiment of the invention, the rectifier circuit includes a resistor. The resistor is coupled between the feedback pin and the light emitting diode unit, and the dimming voltage is generated on the resistor.

In an embodiment of the invention, the rectifier circuit further includes a capacitor. One terminal of the capacitor is coupled to one terminal of the resistor, and another terminal of the capacitor is coupled to another terminal of the resistor or ground.

In an embodiment of the invention, the light emitting diode driving device further includes a current detection unit. The current detection unit is coupled to the power switch, and detects current flowing through the power switch to output a current detection signal to a current detection pin of the control chip. The control chip further adjusts a duty ratio of the switch control signal according to the current detection signal.

In an embodiment of the invention, the light emitting diode driving device further includes a feedback unit, which is coupled to the light emitting diode unit and the filter circuit and provides the feedback signal in response to the output current of the light emitting diode unit.

In an embodiment of the invention, the dimming signal is a pulse width modulation signal.

The light emitting diode backlight module includes a power conversion circuit, a light emitting diode unit and a filter circuit. The power conversion circuit is configured to convert an input voltage into an output voltage. The power conversion circuit has a power switch. A control terminal of the power switch receives a switch control signal and switches a conducting state of the power switch according to the switch control signal to convert the input voltage into the output voltage. The light emitting diode unit is coupled to the power conversion circuit and receives the output voltage to emit light. The control chip is coupled to the power conversion circuit and the light emitting diode unit, and has a dimming pin and a feedback pin. The dimming pin and the feedback pin respectively receive a dimming signal and a feedback signal in response to an output current of the light emitting diode unit. The control chip generates the switch control signal according to a duty ratio of the dimming signal and the feedback signal. The control chip includes a controllable current source. The controllable current source generates a corresponding current according to the duty ratio of the dimming signal. The filter circuit is coupled to the controllable current source through the feedback pin, disposed on a feedback path between the light emitting diode unit and the feedback pin and generates a dimming voltage according to the corresponding current to adjust current flowing through the light emitting diode unit.

In an embodiment of the invention, the filter circuit includes a resistor. The resistor is coupled between the feedback pin and the light emitting diode unit, and the dimming voltage is generated on the resistor.

In an embodiment of the invention, the filter circuit further includes a capacitor. One terminal of the capacitor is coupled to one terminal of the resistor, and another terminal of the capacitor is coupled to another terminal of the resistor or ground.

In an embodiment of the invention, the light emitting diode backlight module further includes a current detection unit. The current detection unit is coupled to the power switch, and detects current flowing through the power switch to output a current detection signal to a current detection pin of the control chip. The control chip further adjusts a duty ratio of the switch control signal according to the current detection signal.

In an embodiment of the invention, the light emitting diode backlight module further includes a feedback unit, which is coupled to the light emitting diode unit and the filter circuit and provides the feedback signal in response to the output current of the light emitting diode unit.

In an embodiment of the invention, the dimming signal is a pulse width modulation signal.

Based on the above, the light emitting diode driving device according to the embodiments of the invention can provide the current to the filter circuit through the controllable current source controlled by the dimming signal so that the filter circuit generates the corresponding dimming voltage to control the current flowing through the light emitting diode unit for achieving the purpose of dimming. Since the dimming signal is a signal that is originally used by the pins of the control chip in the light emitting diode driving device, there would not be a need to additionally provide a control signal to generate the dimming voltage for dimming, thus preventing the number of pins of the control chip from increasing.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
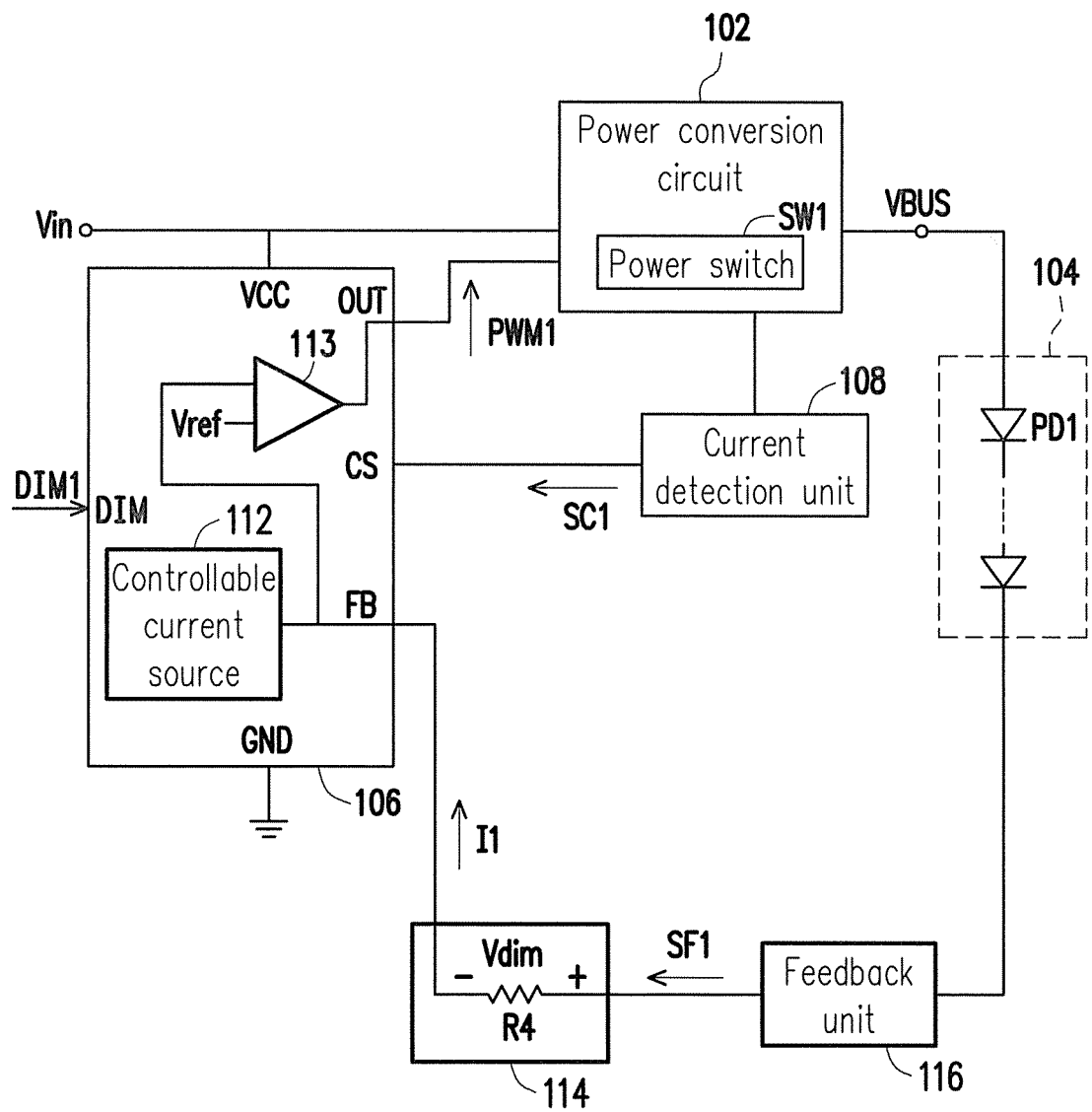
FIG. 1 is a schematic diagram of a light emitting diode backlight module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, FIG. 1 is a schematic diagram of a light emitting diode backlight module according to an embodiment of the invention. The light emitting diode backlight module includes a light emitting diode driving device and a light emitting diode unit 104. The light emitting diode driving device may include a power conversion circuit 102, a control chip 106, a current detection unit 108, a filter circuit 114 and a feedback unit 116. Here, the control chip 106 further includes a controllable current source 112, and the control chip 106 has a power pin VCC, an output pin OUT, a dimming pin DIM, a feedback pin FB, a ground pin GND and a current detection pin CS. The power conversion circuit 102 is coupled to the output pin OUT, and the power conversion circuit 102 is configured to convert an input voltage Vin into an output voltage VBUS. More specifically, the power conversion circuit 102 has a power switch SW1. A control terminal of the power switch SW1 can receive a switch control signal PWM1 (which may be a pulse width modulation signal) and can switch a conducting state of the power switch SW1 according to the switch control signal PWM1 from the output pin OUT to convert the input voltage Vin into the output voltage VBUS. The light emitting diode unit 104 is coupled to the power conversion circuit 102 to receive the output voltage VBUS output by the power conversion circuit 102 to be driven to emit light. The light emitting diode unit 104 may be implemented by a plurality of light emitting diodes PD1 connected in series as shown by FIG. 1, but not limited thereto. The feedback unit 116 is coupled to the light emitting diode unit 104 and the filter circuit 114, and provides a feedback signal SF1 in response to an output current of the light emitting diode unit 104.

The current detection unit 108 is coupled to the power switch SW1 and the current detection pin CS. The current detection unit 108 can detect current flowing through the power switch SW1 to output a current detection signal SC1 to the current detection pin CS of the control chip 106. The control chip 106 can adjust a duty ratio of the switch control signal PWM1 according to the current detection signal SC1, so as to stabilize the output voltage VBUS provided to the light emitting diode unit 104.

The power pin VCC of the control chip 106 is coupled to the input voltage Vin to receive power required for operating the control chip 106, and a ground pin of the control chip 106 is coupled to ground. The feedback pin FB of the control chip 106 can receive the feedback signal SF1 and is compared with a reference voltage of an error amplifier 113 so that the control chip 106 generates the switch control signal PWM1 with a suitable duty cycle to be outputted to the power switch SW1 for achieving a set current.

In addition, an output terminal of the controllable current source 112 in the control chip 106 is coupled to the filter circuit 114 through the feedback pin FB.

The controllable current source 112 can receive a dimming signal DIM1 and generate a corresponding current according to a duty ratio of the dimming signal DIM1. The dimming signal DIM1 may be, for example, a pulse width modulation signal. Here, the feedback pin FB is coupled to a negative input terminal of a comparator (not illustrated) in the control chip 106. The negative input terminal of the comparator and the positive input terminal of the comparator have the same voltage and have the characteristic of high impedance. A current value of a current I1 provided to the filter circuit 114 may be adjusted by adjusting the duty ratio of the dimming signal DIM1. The filter circuit 114 is disposed on a feedback path between the light emitting diode unit 104 and the feedback pin FB, and coupled to the feedback pin FB and the light emitting diode unit 104 so the filter circuit 114 can generate a dimming voltage according to the current I1. Based on the relationship between a voltage on the feedback pin FB, a voltage at a cathode terminal of the LED string and the dimming voltage (the voltage on the feedback pin FB is equal to the cathode terminal of the LED string in the light emitting diode unit 104 plus the dimming voltage), a voltage value of the dimming voltage may be changed by adjusting the value of the current I1 (the value of the current I1 may be adjusted by adjusting the duty ratio of the dimming signal DIM1), the current flowing through the light emitting diode unit 104 may be changed to achieve the purpose of dimming the light emitting diode unit 104.

With use of the dimming signal DIM1 received by the dimming pin DIM for controlling the controllable current source 112 to generate the corresponding current so that the filter circuit 114 generates the corresponding dimming voltage, the purpose of dimming the light emitting diode unit 104 may be achieved without additionally providing the control signal to generate a set of dimming voltages, thus preventing the number of pins of the control chip 106 from increasing.

Figure 2:
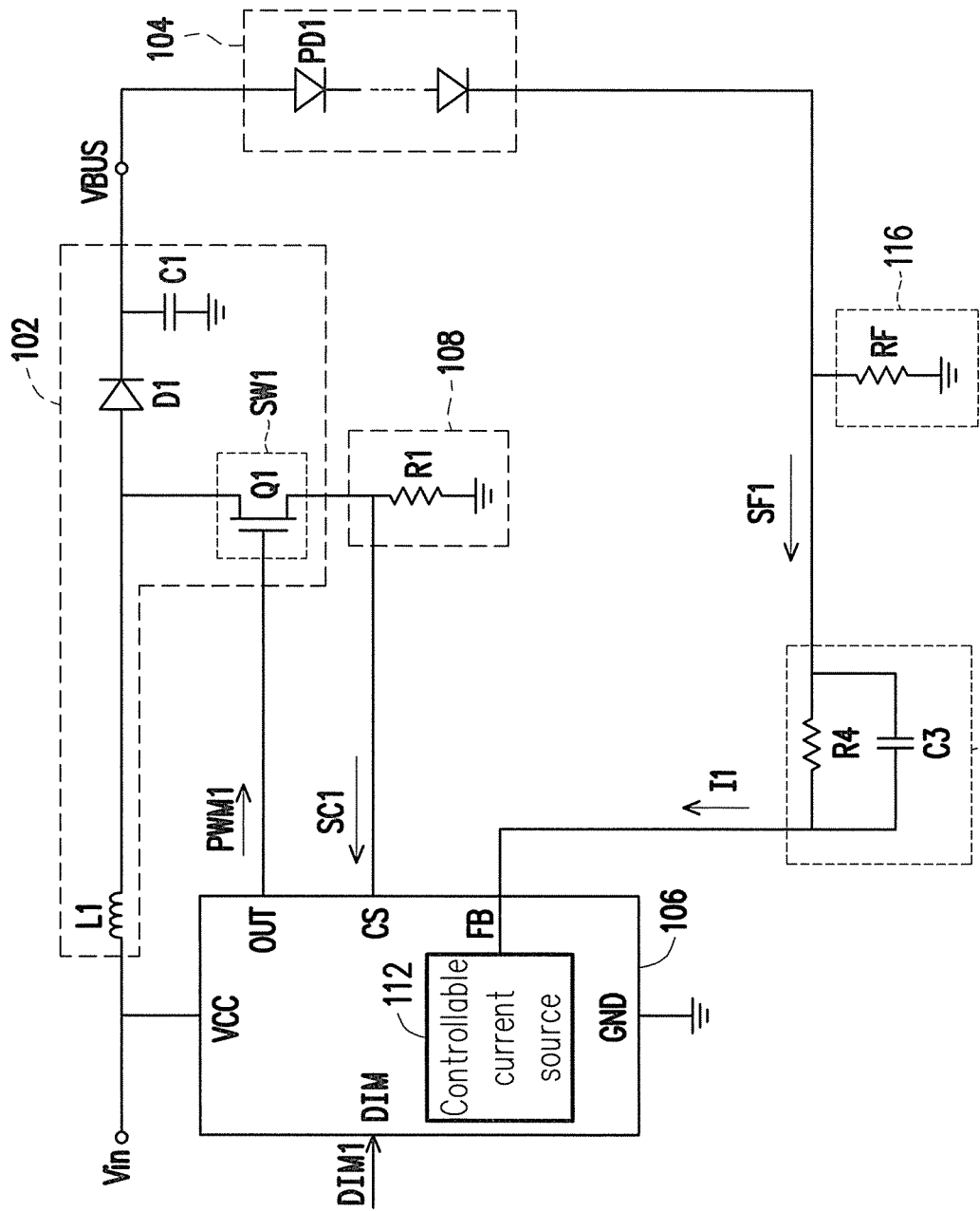
FIG. 2 is a schematic diagram of a light emitting diode driving device according to another embodiment of the invention.

With reference to FIG. 2, FIG. 2 is a schematic diagram of a light emitting diode backlight module according to another embodiment of the invention. In detail, in this embodiment, the power conversion circuit 102 of the light emitting diode backlight module may include an inductor L1, a rectifier diode D1, a transistor Q1, and a capacitor C1. Here, the transistor Q1 is used to implement the power switch SW1 described above. The transistor Q1 has a gate coupled to the output pin OUT, and a drain and a source respectively coupled to the inductor L1 and the current detection unit 108. The inductor L1 is coupled between the input voltage Vin and the drain of the transistor Q1. An anode and a cathode of the rectifier diode D1 are respectively coupled to a common joint of the inductor L1 and the transistor Q1 and an output terminal of the power conversion circuit 102. The capacitor C1 is coupled between the cathode of the rectifier diode D1 and the ground. When the transistor Q1 is turned on, the input voltage Vin is connected across the inductor L1 to linearly increase a current of the inductor L1 and store energy in the inductor L1. When the transistor Q1 reaches an expected turned-on time, the transistor Q1 is turned off to output the stored energy through the rectifier diode D1 to the output terminal of the power conversion circuit 102 and charge the capacitor C1. The input voltage Vin may be raised to a level set for the output terminal of the power conversion circuit 102 by alternatively repeating the above operations.

Further, in this embodiment, the current detection unit 108 includes a resistor R1. Here, one terminal of the resistor R1 is coupled to the source of the transistor Q1 and the current detection pin CS, and another terminal of the resistor R1 is coupled to sense current flowing through the transistor Q1. The feedback unit 116 includes a resistor RF. The resistor RF is coupled between the light emitting diode unit 104 and the ground to generate the feedback signal SF1 for the feedback pin FB at a common joint of the light emitting diode unit 104 and the resistor RF.

Moreover, in this embodiment, the filter circuit 114 may include a capacitor C3 and a resistor R4. Here, the capacitor C3 and the resistor R4 are coupled in parallel between the feedback pin FB and the light emitting diode unit 104. In some embodiments, the capacitor C3 may also have one terminal coupled to the feedback pin FB and another terminal coupled to the ground in order to form the filter circuit 114 together with the resistor R4. Based on the relationship between a voltage on the feedback pin FB, a voltage at a cathode terminal of the LED string and the dimming voltage (the voltage on the feedback pin FB is equal to the cathode terminal of the LED string in the light emitting diode unit 104 plus the dimming voltage), by changing a dimming voltage generated by the filter circuit 114 according to the current I1 (the dimming voltage is a voltage across on the resistor R4 in this embodiment), the current flowing through the light emitting diode unit 104 may be changed to achieve the purpose of dimming the light emitting diode unit 104. In other words, the current value of the current I1 flowed from the feedback pin FB may also be adjusted by changing the duty ratio of the dimming signal DIM1 so that the purpose of dimming the light emitting diode unit 104 may be achieved without additionally providing the control signal to generate the dimming voltage for dimming.

In summary, the light emitting diode driving device according to the embodiments of the invention can provide the current to the filter circuit through the controllable current source controlled by the dimming signal so that the filter circuit generates the corresponding dimming voltage to control the current flowing through the light emitting diode unit for achieving the purpose of dimming.

Since the dimming signal is a signal that is originally used by the pins of the control chip in the light emitting diode driving device, there would not be a need to additionally provide a control signal to generate the dimming voltage for dimming, thus preventing the number of pins of the control chip from increasing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light emitting diode driving device, adapted to drive a light emitting diode unit, the light emitting diode unit comprising:
   a power conversion circuit, configured to convert an input voltage into an output voltage to drive the light emitting diode unit, the power conversion circuit having a power switch, a control terminal of the power switch receiving a switch control signal and switching a conducting state of the power switch according to the switch control signal to convert the input voltage into the output voltage;
   a control chip, coupled to the power conversion circuit and the light emitting diode unit and having a dimming pin and a feedback pin, the dimming pin and the feedback pin respectively receiving a dimming signal and a feedback signal in response to an output current of the light emitting diode unit, the control chip generating the switch control signal according to a duty ratio of the dimming signal and the feedback signal, the control chip comprising:

a controllable current source, generating a corresponding current according to the duty ratio of the dimming signal; and a filter circuit, coupled to the controllable current source through the feedback pin, disposed on a feedback path between the light emitting diode unit and the feedback pin, wherein the filter circuit comprises a resistor coupled between the feedback pin and the light emitting diode unit, the controllable current source adjusts the corresponding current flowing through the feedback pin to change a dimming voltage generated on the resistor, and thus to adjust a current flowing through the light emitting diode unit.

2. The light emitting diode driving device according to claim 1, wherein the filter circuit further comprises:

a capacitor, having one terminal coupled to one terminal of the resistor and another terminal coupled to another terminal of the resistor or ground.

3. The light emitting diode driving device according to claim 1, further comprising:

a current detection unit, coupled to the power switch, and detecting current flowing through the power switch to output a current detection signal to a current detection pin of the control chip, the control chip further adjusting a duty ratio of the switch control signal according to the current detection signal.

4. The light emitting diode driving device according to claim 1, further comprising:

a feedback unit, coupled to the light emitting diode unit and the filter circuit and providing the feedback signal in response to the output current of the light emitting diode unit.

5. The light emitting diode driving device according to claim 1, wherein the dimming signal is a pulse width modulation signal.

6. A light emitting diode backlight module, comprising:

a power conversion circuit, configured to convert an input voltage into an output voltage, the power conversion circuit having a power switch, a control terminal of the power switch receiving a switch control signal and switching a conducting state of the power switch according to the switch control signal to convert the input voltage into the output voltage;

a light emitting diode unit, coupled to the power conversion circuit and receiving the output voltage to emit light;

a control chip, coupled to the power conversion circuit and the light emitting diode unit and having a dimming pin and a feedback pin, the dimming pin and the feedback pin respectively receiving a dimming signal and a feedback signal in response to an output current of the light emitting diode unit, the control chip generating the switch control signal according to a duty ratio of the dimming signal and the feedback signal, the control chip comprising:

a controllable current source, generating a corresponding current according to the duty ratio of the dimming signal; and a filter circuit, coupled to the controllable current source through the feedback pin, disposed on a feedback path between the light emitting diode unit and the feedback pin, wherein the filter circuit comprises a resistor coupled between the feedback pin and the light emitting diode unit, the controllable current source adjusts the corresponding current flowing through the feedback pin to change a dimming voltage generated on the resistor, and thus to adjust a current flowing through the light emitting diode unit.

7. The light emitting diode backlight module according to claim 6, wherein the filter circuit further comprises:

a capacitor, having one terminal coupled to one terminal of the resistor and another terminal coupled to another terminal of the resistor or is grounded.

8. The light emitting diode backlight module according to claim 6, further comprising:

a current detection unit, coupled to the power switch, and detecting current flowing through the power switch to output a current detection signal to a current detection pin of the control chip, the control chip further adjusting a duty ratio of the switch control signal according to the current detection signal.

9. The light emitting diode backlight module according to claim 6, further comprising:

a feedback unit, coupled to the light emitting diode unit and the filter circuit and providing the feedback signal in response to the output current of the light emitting diode unit.

10. The light emitting diode backlight module according to claim 6, wherein the dimming signal is a pulse width modulation signal.

* * * * *